`US005099930A`

United States Patent [19]
Enright et al.

[11] Patent Number: 5,099,930
[45] Date of Patent: * Mar. 31, 1992

[54] DRILLING FLUID METHODS AND COMPOSITION

[75] Inventors: Dorothy P. Enright; William M. Dye; F. Martin Smith; Alphonse C. Perricone, all of Houston, Tex.

[73] Assignee: Baker Hughes Incorporated, Houston, Tex.

[*] Notice: The portion of the term of this patent subsequent to Apr. 16, 2008 has been disclaimed.

[21] Appl. No.: 646,088

[22] Filed: Jan. 25, 1991

Related U.S. Application Data

[63] Continuation of Ser. No. 515,573, Apr. 27, 1990, Pat. No. 5,007,489.

[51] Int. Cl.$^5$ .......................... E21B 2/00; C09K 7/00
[52] U.S. Cl. ........................................ 175/65; 507/139
[58] Field of Search .................... 175/65; 166/301; 252/8.51, 8.511, 8.513

[56] References Cited

U.S. PATENT DOCUMENTS

| | | | |
|---|---|---|---|
| 1,970,578 | 8/1934 | Schoeller et al. | 252/356 X |
| 3,223,622 | 12/1965 | Lummus et al. | 175/65 X |
| 3,728,259 | 4/1973 | Christman | 175/65 X |
| 3,762,485 | 10/1973 | Chesser et al. | 175/65 |
| 4,230,587 | 10/1980 | Walker | 166/301 X |
| 4,561,985 | 12/1985 | Glass, Jr. | 252/8.51 X |
| 4,614,235 | 9/1986 | Keener et al. | 252/8.551 X |
| 4,776,966 | 10/1988 | Baker | 252/8.511 X |

*Primary Examiner*—George A. Suchfield
*Attorney, Agent, or Firm*—Tim L. Burgess

[57] ABSTRACT

A method is provided for the prevention of balling of formation cuttings upon the surface of drilling equipment and for lubrication of said equipment used in conjunction with subterranean well operations. An aqueous system is prepared to which is added a composition of a water insoluble polyglycol having a molecular weight of from between about 1,200 and about 10,000, an emulsifying surfactant having a hydrophilic/hydrophobic balance of about 4 or more, and a hydrotrope. An additive for use in the method also is disclosed.

8 Claims, No Drawings

DRILLING FLUID METHODS AND COMPOSITION

This is a continuation of co-pending application Ser. No. 515,573, filed on Apr. 27, 1990 now U.S. Pat. No. 5,007,489.

BACKGROUND OF THE INVENTION

1. FIELD OF THE INVENTION

The invention relates to a method for the prevention of balling during drilling, completion and workover of subterranean oil and gas wells and to the lubrication of well drilling equipment, as well as to an additive for such use.

2. DESCRIPTION OF THE PRIOR ART

When drilling, completing or working over subterranean wells in order to tap deposits of, for example, oil or gas, and in particular when utilizing a rotary drilling method comprising a bit to which is attached a drill stem, the bit will penetrate the formation. The formation is composed of both inorganic and organic substances, such as clays and other minerals as well as fossils, peat etc. As the drill bit teeth penetrate the formation, drill chips are generated by the action of the bit. These drill chips are wetted by the drilling fluid which can produce sticky, plastic fragments. These fragments adhere to the bit surface and the force and weight of the bit extrudes the water from the plastic fragments forming a compacted mass of the formation onto the bit surface that interferes with the cutting action of the bit teeth as evidenced by a reduction in penetration rate. Balling also occurs on drill collars and stabilizers Bit balling resulting in the compaction and adherence of drill chips to the face of the cutters and the bit is a primary cause of reduction of penetration rate during drilling operations. Bit balling is believed to be the result of the adhesive forces between shale and the bit surface which become significant when ductile shales deform and are forced into intimate contact with each other and the bit surface.

A liquid adheres to a solid surface if the attraction of the molecules to the solid surface is greater than their attraction to each other, i.e., the work of adhesion is greater than the work of cohesion. This criterion may be expressed thermodynamically as:

$$W_A = F_S + F_L - F_I$$

Where $W_A$ is the work of adhesion; $F_S$ is the surface free energy of the solid; $F_L$ is the surface free energy of the liquid; and $F_I$ is the surface free energy of the newly formed interface. In terms of this expression, the work of cohesion, (WC), is In terms of this expression, the work of cohesion, ($W_C$), is equal to 2 x $F_L$.

In order for adhesion to occur between the solid surface and a liquid, the work of adhesion must be greater than that of cohesion:

$$W_A - W_C = F_S - F_L - F_I$$

Accordingly, adhesion of the liquid to a solid occurs when the surface free energy of the solid surface exceeds that of the liquid and interface:

$$F_S > F_L + F_I$$

Shales adhere to bits and drill collars if they are forced into intimate contact by the force and weight of the drill string. The mechanism of adhesion in this instance is probably hydrogen bonding extending from the molecular layers of water absorbed on the surface of the shale surface to the layer of water adhering to the water-wet steel surface of the bit.

In the past, those skilled in the art have particularly relied upon use of oil-based or water-in-oil (invert emulsions) drilling fluids to eliminate or control bit balling although several aqueous based fluids and additives have been contemplated by those skilled in the art. The environmental problems and costs associated with the use of oil-based or invert emulsion systems have discouraged and/or prohibited their use on many wells.

Accordingly, the present invention addresses the problem set forth above by providing an aqueous based fluid containing therein a material which acts as a synthetic oily-like substance to inhibit bit balling upon metallic surfaces of drilling, completion and workover equipment.

Applicants are aware of the following prior art relating to the general subject area of this invention:

| U.S. Pat. No. | PATENTEE |
| --- | --- |
| 2,241,255 | Garrison |
| 2,498,301 | Self |
| 3,550,236 | Fischer et al |
| 2,727,002 | Rowe |
| 3,047,494 | Browning |
| 3,219,580 | Stratton |
| 3,308,068 | Jones |
| 3,414,517 | Mosier et al |
| 3,575,855 | Estes |
| 3,762,485 | Chesser et al |
| 3,979,305 | Fischer et al |
| 4,040,866 | Mondshine |
| 4,063,603 | Rayborn |
| 4,064,056 | Walker et al |
| 4,140,642 | Kistler et al |
| 4,172,800 | Walker |
| 4,212,794 | Grodde et al |
| 4,289,631 | Luxenburg |
| 4,409,108 | Carney et al |
| 4,425,241 | Swanson |
| 4,425,461 | Turner et al |
| 4,425,462 | Turner et al |
| 4,425,463 | Walker et al |
| 4,830,765 | Perricone et al |

SUMMARY OF THE INVENTION

The present invention incorporates an additive and method for the prevention of balling of formation cuttings upon the surface of drilling equipment, particularly, drill bits, which are used in conjunction with the drilling, completion or workover of a subterranean well and for imparting lubricity to such drilling equipment and for lubrication purposes.

The methods comprise the steps of first preparing an aqueous system. Thereafter, to the system is added a composition comprising a non-water soluble polyglycol having a molecular weight of from between about 1,200 and about 10,000, together with an emulsifying surfactant having a hydrophilic/hydrophobic balance of about 4 or more, together with a hydrotrope.

Upon addition of the composition to the aqueous mud system, emulsification is achieved by the shearing action in the mud hopper, if the composition is added through the hopper, and the shearing action of the surface equipment. Additional shearing will be obtained at the drill bit as the fluid passes through the nozzles of the drill bit which is rotating at high speeds.

The system is introduced into the well for circulation through and out of the well. When it passes through the bit nozzles, the drilling fluid is in contact with the bit surface at which time the emulsion droplets contact and spread over the bit surface replacing the water film adhering to the bit surface.

A drilling fluid containing the present invention emulsified therein will exhibit a lubricity coefficient lower than that of a similar fluid without the composition as determined by the American Petroleum Institute's "Procedure for Determination of Lubricity Coefficient (Tentative)" 1980.

DESCRIPTION OF THE PREFERRED EMBODIMENTS

As contemplated herein, the present invention is intended for use in an aqueous drilling fluid or, as sometimes referred to, an "aqueous system". The base for such system may be either fresh water, a brine, sea water or any combinations thereof. The system may also contain other known drilling fluid additives, such as bentonite, barite, gums, water soluble polymers and similar viscosity modifying agents, as well as chemical thinners.

The composition which is utilized in the methods incorporates a non-water soluble polyglycol having a molecular weight of from between about 1,200 and about 10,000. Since an objective in selecting a suitable polyglycol is that it be non-water soluble, it will be appreciated by those skilled in the art that molecular weight is a factor in the determination of water solubility. Accordingly, it is believed that any polyglycol having a molecular weight below about 1 200 will have a tendency to be water soluble or at least not sufficiently non-water soluble for satisfactory incorporation into the present invention. While an upper molecular weight criteria is not as essential as that for the lower most point of molecular weight, it is believed that a polyglycol in excess of a molecular weight of about 10,000 may not be satisfactorily utilized in the present invention because of difficulty in preparation and handling these more viscous materials.

The non-water soluble component of this invention may be a di-hydroxy alcohol such as a polypropylene glycol or a propoxylated tri-hydroxy alcohol such as polypropylene glycerol. Ethylene oxide propylene oxide copolymers of di-hydroxy and tri-hydroxy alcohols may also be used.

When incorporated into the present invention, the selected non-water soluble polyglycol should be added in an amount of about 80% by weight of the total composition utilized in the aqueous system.

The emulsifying surfactant of the present invention concentrates itself at the surface of the polyglycol droplets forming an interfacial film around the droplet, thus lowering the interfacial tension between the polyglycol droplet and water. Accordingly, the surfactant stabilizes the droplet, i.e. decreases its need to interact with other droplets (coalesce) in an effort to lower its surface face energy. The surfactant in the interface also promotes the wetting and spreading of the polyglycol droplet on the bit surface. In the interfacial film formation, the surfactant orients itself so that the organic "tail" extends into the body of the droplet and the cation associated with it is projected toward the water phase thus producing a droplet which appears to be positively charged when in contact with the negatively charged bit and shale surfaces.

The selected emulsifying agent is preferably oil soluble, preferably anionic and preferably has a hydrophilic/hydrophobic balance of about 4 or higher. Those skilled in the art will recognize that the hydrophilic/hydrophobic balance (HLB) may be calculated from the formula required depending upon the compound. It is also recognized that HLB values obtained by such calculations are not absolute and often times differ from the HLB value found by experimental determination and that HLB values are only a rough guide to emulsification solutions and that HLB values may change when the environment in which they are placed changes, i.e. a temperature increase.

Preferably, the anionic emulsifying surfactant is oil soluble and is a sulfonated petroleum natural acid. Other anionic or nonionic surfactants may be selected such as sulfated soybean oil, long chain alcohols, esters of fatty acids and complex amines.

The selected emulsifying surfactant should not cause oil wetting of the weighting agent and solids in the aqueous system nor should the amount thereof produce a foam. The amount of the selected emulsifying surfactant normally will be surprisingly small, on the order of about 10% of the total weight of the composition used in the aqueous system. It has been found that incorporation of the selected emulsifying surfactant for use in the present invention at this level will provide a comparably tight emulsion, resulting in the formation of stable droplets of oil-like substance for adherence to the metallic surface of the drill bits, and other drilling equipment.

The hydrotrope of the present invention is incorporated to make the surfactant and polyglycol of composition of the present invention more compatible and to make the composition more compatible with the aqueous phase of the drilling fluid. In practicing the present invention, any water soluble salt of a sulfonated xylene may be utilized as the selected hydrotrope. Preferably, sodium xylene sulfonate may be utilized, but other water soluble salts selected from the class consisting of water soluble salts of sulfonated xylene, cumene and toluene may be selected as the hydrotrope for use in the present invention.

The composition of the present invention when utilized in the methods does not form a satisfactory emulsion without shearing. Such shearing may be created by application of surface mixing equipment used in drilling mud compounding when prepared in, for example, a mud pit at the well site. Alternatively, the composition may be placed into a circulated aqueous system introduced into the subterranean well and the shearing action of the fluids by the pumps and jet nozzles will form a stable polypropylene glycol in water emulsion of the composition in the aqueous system. The small but stable polypropylene glycol droplets thus formed will adhere to the drill bit or other metallic surface of the drilling equipment to provide a non-water wetting interface between such surface and the water-wet shale fragments in the aqueous system to prevent balling.

As the drilling fluid containing the aqueous system and the emulsified composition of the present invention is circulated within the subterranean well, it will come in contact with the surfaces of the drill bit. The emulsified droplets of the composition will adhere and spread over the bit surface causing it to be polyglycol wet thus resulting in an interruption of the water-to-water bonding which occurs between the water-wet bit surface and the water-wet shale which in turn eliminates the tendency for bit balling. Such contact will also impart lubricity to the surface of such equipment, reducing for example problems of differential sticking, torque and the like.

As an alternative to preparation of the emulsion of the composition of the present invention as described above, such emulsion may be prepared in situ. For example, the polyglycol may be added to the aqueous system which has therein satisfactory emulsifying surfactants and which may or may not contain a hydrotrope. Thus, the in situ preparation of the emulsion is contemplated.

A laboratory method has been established for testing and examining the adhesive and cohesive forces between shale to metal and shale to shale which are involved in the bit balling phenomenon. In such method, a Carver press is used to form a shale disc in a steel mold under a confining pressure onto a metal plate having a surface roughness (RMS) of 300. The force, in pounds, required to shear the shale disc from the surface of the steel plate is measured with a MTS instrument. In actual tests, the freshly cleaned water-wet metal plate is coated with a thin film of the sample fluid before the mold and shale are placed on it. A pressure of 2,500 psi is applied to the shale for ten minutes before the adherence value is determined. In using this testing procedure, the adherence value, in pounds, for a water-wet plate was found to be 175-225, whereas the adherence value for an oil-wet plate was found to be 0. According to this test, the closer the adherence value preventing bit balling.

A drilling fluid in which the composition of the present invention has been emulsified has been found to have excellent lubricity characteristics. For the purpose of determining lubricity, we have utilized in our testing the "Procedure for Determination of Lubricity Coefficient" (Tentative), a standardized testing procedure published by the American Petroleum Institute, (1980) as follows:

1. Calibration of Instrument
   a. Prepare a calibration curve for conversion of ammeter reading to lubricity coefficient by using a Prony brake and procedure provided with the instrument.
   b. Recalibrate if the drive motor is altered or replaced.
2. Standardization of Test Ring and Block
   a. Wash the test ring and block with water and a household cleanser. Rinse thoroughly with water.
   b. Place the test ring on the tapered shoulder at the bottom of the shaft and secure with the lock nut.
   c. Place the test block in the holder, concave side face out, and align with the test ring.
   d. Fill the sample container with water (approximately 300 cm$^3$) and position it so that the test surfaces are covered.
   e. Attach a rheostat in series with the instrument and turn on the drive motor. Adjust the rheostat until the tachometer on the drive shaft reads 60 rpm.
   f. Apply 150 in.-lb load with the torque arm. Maintain speed at 60 rpm.
   g. Observe meter reading in amperes and refer to the calibration chart for the lubricity coefficient. Run for several minutes or until the reading stabilizes. The lubricity coefficient for water should be between 0.33 and 0.36. If it is not in this range, the ring and block surfaces should be reconditioned using one of the following methods:
   (1) Continue to operate the instrument at a constant load of 150 in.-lb with water in contact with the test surfaces. The ammeter reading should slowly approach the test range of 33 to 36 and then remain steady.
   (2) Operate the instrument using a slurry of about 25 lb per bbl of bentonite in fresh water and a load of 150 in.-lb. Repeat step (1).
   (3) Place a grinding compound on the contact surfaces and operate the instrument at a load of 150 in.-lb. Repeat Step (1).
3. Determination of Mud Lubricity Coefficient
   a. Assemble the instrument and standardize the test ring and block to give a 0.33 to 0.36 lubricity coefficient for water.
   b. Stir the mud sample ten minutes on a Multimixer prior to testing.
   c. Place the mud sample in the container and position to cover the ring and block.
   d. Start the motor and adjust the rheostat to give 60 rpm with a load of 150 in.-lb.
   e. Operate the instrument until the ammeter reading stabilizes.
   f. Use the calibration curve to convert the ammeter reading to lubricity coefficient.

EXAMPLE I

Using the procedure outlined above, several compositions in accordance with the present invention were prepared using polypropylene glycols having selected molecular weights of 1000 and 2000. The nonionic emulsifying surfactant was Neodol 25-7, which is a $C_{12}$-$C_{15}$ nonionic linear primary alcohol ethoxylate made by Shell Chemical Co. In some tests, the selected anionic emulsifying surfactant was Drillaid 403 which is a complex amine sulfonate prepared from about 4 parts of a half ammonium, half isopropylamine salt of the sulfosuccinic acid ester of the oleic acid amid of isopropanol amine and about 1 part of the isopropylamine salt of dodecyl benzene sulfonic acid, made in accordance with U.S. Pat. No. 3,472,768. Another nonionic emulsifying surfactant was BRIJ 72 which is a polyoxyethylene stearyl ether, manufactured by ICI Americas Inc. Adherence force, in pounds, was determined, as set forth above. The results of the tests indicated that when the non-water soluble polyglycol having a molecular weight above about 1200 was utilized an unstable emulsion was formed, yet a decrease in adherence value was obtained. However, when the polyglycol was emulsified in accordance with the present invention, adherence values were further decreased. The results 1 of this test are set forth in Table 1, below:

TABLE 1

| ADHERENCE VALUES OF POLYPROPYLENE GLYCOL IN WATER EMULSIONS | | | | | |
|---|---|---|---|---|---|
| Polypropylene Glycol | | Surfactant | | Water | Adherence |
| % (Wt.) | Mol. Wt. | % (Wt.) | Type | % (Wt.) | Value lbs. |
| 0 | | 0 | — | 100 | 162,229 |
| 2.5 | 1000 | 0 | — | 97.5 | 44 |
| 2.5 | 2000 | 0 | — | 97.5 | 100 |
| 2.4 | 1000 | 0.3 | A | 97.3 | 60,18 |
| 2.9 | 2000 | 1.4 | B | 95.7 | 0,16 |
| 2.9 | 1000 | 1.4 | B | 95.7 | 9,0 |

TABLE 1-continued
ADHERENCE VALUES OF POLYPROPYLENE GLYCOL IN WATER EMULSIONS

| Polypropylene Glycol | | Surfactant | | Water | Adherence |
|---|---|---|---|---|---|
| % (Wt.) | Mol. Wt. | % (Wt.) | Type | % (Wt.) | Value lbs. |
| 2.4 | 2000 | 0.9 | C | 96.7 | 0.33 |

A = ethoxylated linear primary alcohol - nonionic (Neodol 25-7, Shell Chemical Co.)
B = complex amine salts - anionic
C = ethyoxylated alcohol ether - nonionic (BRLJ 72, ICI Americas Inc.)

EXAMPLE II

Tests were conducted and results were evaluated as in Example I, above, and the selected non-water soluble polyglycerol was propylene glycerol. In some of the tests, combinations of the selected glycerol at two different molecular weights were tested. The results are set forth in Table II, below:

TABLE 2
ADHERENCE VALUES OF POLYPROPYLENE GLYCOL IN WATER EMULSIONS

| Polypropylene Glycerol | | Surfactant | | Water | Adherence |
|---|---|---|---|---|---|
| % (Wt.) | Mol. Wt. | % (Wt) | Type | % (Wt) | Value lbs. |
| 0 | — | 0 | — | 100 | 162,229 |
| 2.5 | 2000 | — | | 97.5 | 55 |
| 2.5 | 3000 | 0 | — | 97.5 | 69 |
| 2.5 | 7500 | 0 | — | 97.5 | 27 |
| 2.4 | 2000 | 0.9 | A | 96.7 | 66 |
| 2.4 | 3000 | 0.9 | A | 96.7 | 20,10 |
| 2.4 | 7500 | 0.9 | A | 96.7 | 0,6,25 |
| 2.9 | 2000 | 1.4 | B | 95.7 | 0 |
| 2.9 | 3000 | 1.4 | B | 95.7 | 13 |
| 1.4 | 7500 | 1.4 | B | 95.7 | 0 |
| 1.4 | 3000 | | | | |
| 2.1 | 7500 | 1.4 | B | 95.7 | 0 |
| 0.7 | 3000 | | | | |
| 0.7 | 7500 | 1.4 | B | 95.7 | 0 |
| 2.1 | 3000 | | | | |

A = ethoxylated linear primary alcohol - nonionic (Neodol 25-7, Shell Chemical Co.)
B = complex amine salt - anionic

EXAMPLE III

The method of the present invention was demonstrated in actual field application by preparing an aqueous system whose primary constituents were bentonite, a copolymer of 2-acrylamido-2-methyl propane sulfonic acid (AMPS) /acrylamide (AM) and barite to which was added a composition with a non-water soluble dihydroxy alcohol being polypropylene glycol in an amount of about 80% by weight of the total composition formulation, together with Petrosul H-50 as the selected anionic surfactant in an amount of about 10% by weight of the total composition. The hydrotrope was sodium xylene sulfonate in an amount of about 10% by weight of the entire composition formulation. The composition was added to a water based drilling fluid at the mud plant and/or on location. Emulsification was achieved by shearing with the surface mixing equipment.

The system was introduced into the well for circulation through and out of the well and the composition contacted the selected drill bit to provide a polypropylene glycol film between the drill bit and the drilled shale chips.

The ability to prevent bit balling in these actual field applications is demonstrated by the average rate of penetration calculated in drilled feet per hour, compared with the through similar formations at the same approximate depths but with oil base, (invert emulsion) and water based drilling fluids. The well drilled with a fluid containing the composition of the present process was identified as well "A". The average rate of penetration in this well was 23 feet per hour which compared quite favorably to the average rate of penetration of 21.6 feet per hour for the seven (7) wells drilled with the oil based fluid. The average rate of penetration ("ROP") for wells "C", "D" and "I" were 32.6% to 2.2% higher than that of well "A" while the average ROP for wells "D", "F", "G" and "H" were 42.2% to 3.0% lower. Well "B" was drilled using a lignosulfonate/potassium hydroxide water based drilling fluid, resulting in an average rate of penetration of 12.4 feet per hour, 46.1% less than the average ROP of well "A". For well "J" which was drilled with a polymer water based drilling fluid, the average ROP was 20.2 feet per hour or 12.2% less than that of well "A". The results of this test are set forth in Table 3:

TABLE 3

| Well No. | Mud Type | Bit Size | No. | Feet Drilled | Drilling Time | Avg. ROP, ft/hr | % Chg. ROP |
|---|---|---|---|---|---|---|---|
| A | Water-base | 8¾" | 3 | 2,697 | 117.5 | 23.0 | — |
| B | Water-base* | 8½" | 5 | 2,297 | 185.5 | 12.4 | −46.1 |
| C | Oil-base | 8¾" | 2 | 2,305 | 90 | 25.6 | +11.3 |
| D | Oil-base | 6¼" | 4 | 2,550 | 192 | 13.3 | −42.2 |
| E | Oil-base | 8¾" | 1 | 1,890 | 62 | 30.5 | +32.6 |
| F | Oil-base | 8½" | 3 | 2,773 | 167 | 16.6 | −27.8 |
| G | Oil-base | 8¾" | 3 | 2,400 | 125.5 | 19.1 | −17.0 |
| H | Oil-base | 8½" | 4 | 2,501 | 112 | 22.3 | −3.0 |
| I | Oil-base | 8¾" | 3 | 4,855 | 206.5 | 23.5 | +2.2 |
| J | Polymer** | 8½" | 3 | 2,983 | 147.5 | 20.2 | −12.2 |

*Lignosulfonate/KOH fluid
**Hydrolyzed polyacrylamide in water

EXAMPLE IV

The process of the present invention was demonstrated in a second field application by preparing an aqueous system as described in Example III. Well "A" was drilled with a fluid containing the composition of the present process. The average ROP for it was 30.3 feet per hour and it was drilled in 255 hours using only 3 bits. Wells "B" and "C" were drilled with lignosulfonate water based drilling fluids. The average ROP for well "B" was 22.8 feet per hour and 11 bits were required while for well "C" the average ROP was 19.2 and 12 bits were required. The decrease in the number of bits used when drilling with a fluid containing the composition of the present process (Well "A") is indicative of the lubricating qualities of the present composition. The results of this test are set forth in Table 4:

TABLE 4

| Well No. | Mud Type | Bit Size | No. | Feet Drilled | Drilling Time/ Hrs. | Avg. ROP | % Chg. ROP |
|---|---|---|---|---|---|---|---|
| A | Water-base | 9.875" | 3 | 7,710 | 255 | 30.3 | — |
| B | Water-base | 9.875" | 11 | 8,545 | 377 | 22.7 | −25.1 |
| C | Water-base | 9.875" | 12 | 7,048 | 366.5 | 19.2 | −34.7 |

The invention composition when used as described above will perform as a lubricant in the mud system. The polyglycol wet surfaces of the drilling assembly and bit glide more freely through the fluid because of the decreased attraction between the polyglycol-wet assembly and bit and the aqueous fluid.

EXAMPLE V

To demonstrate the lubricating properties of the present invention a laboratory mud was prepared consisting of 10 lb/bbl sodium bentonite; 1 lb/bbl AMPS-AM copolymer; 1 lb/bbl CMC; 165.4 lb/bbl barite; and 21.9 lb/bbl simulated drill solids. Using the method previously described, the lubricity coefficient of the mud before and after varying amounts of the composition were added to the base mud.

As shown in Table 5, the addition of 2.5% by volume of the present composition reduced the lubricity coefficient by 58% and the addition of 4.5% by volume reduced the lubricity coefficient by 81%.

TABLE 5

| Lubricity Coefficient | |
|---|---|
| % Polypropylene Composition | Lubricity Coefficient |
| 0 (base mud) | 0.31 |
| 2.5 | 0.13 |
| 3.5 | 0.05 |
| 4.5 | 0.06 |
| 5.5 | 0.06 |

EXAMPLE VI

Tests were performed, as above, to determine the lubricity coefficient of a base mud having present therein polypropylene glycols of varying molecular weights, with the polypropylene glycols being added to the base mud composition. The results of this test are set forth in Table 6 which indicates that each of the molecular weight materials, within the scope of the claims of this invention, decreased the lubricity coefficient significantly.

TABLE 6

| | Lubricity Coefficient | % Decrease |
|---|---|---|
| Base Mud | 0.27 | |
| +4% 1200 PPG | 0.21 | 22.2 |
| +4% 2000 PPG | 0.20* | 25.9 |
| +4% 4000 PPG | 0.20* | 25.9 |
| +4% 5700 PPG | 0.23* | 14.8 |

Base Mud Composition
25 lb/bbl gelling agent
0.6 lb/bbl NaOH
1.0 lb/bbl sodium lignosulfonate
29.0 lb/bbl barite
*Emulsion broke during test.
Number before PPG is the average molecular weight.

EXAMPLE VII

The present example was performed incorporating polypropylene glycol additives including an identified surfactant. The results of this test are set for in Table 7, below:

TABLE 7

Effect of Polypropylene Glycol-Surfactant Mixtures On Lubricity Coefficient of a Drilling Fluid

| | Lubricity Coefficient | % Decrease |
|---|---|---|
| Base Mud | 0.27 | |
| +4% 1200 PPG-Span 20 | 0.05 | 81.5 |
| +4% 1200 PPG-Tween 85 | 0.10 | 63.0 |
| +4% 2000 PPG-Brij 92 | 0.12 | 55.5 |
| +4% 4000 PPG-Neodol 25-3 | 0.19* | 25.9 |
| +4% 4000 PPG-Petrosul H-50 | 0.03 | 88.9 |

TABLE 7-continued

Effect of Polypropylene Glycol-Surfactant Mixtures On Lubricity Coefficient of a Drilling Fluid

| | Lubricity Coefficient | % Decrease |
|---|---|---|
| +4% 5700 PPG-Petrosul H-50 | 0.03 | 88.9 |

*Emulsion broke during testing.
Number before PPG is the average molecular weight.
Base Mud Composition
25 lb/bbl gelling agent
0.06 lb/bbl NaOH
1.0 lb/bbl sodium lignosulfonate
29.0 lb/bbl barite
1. The Polypropylene glycol-surfactant additions consists of 90% PPG and 10% surfactant.
2. Surfactants:
Span 20 . . . sorbitan monolaurate, nonionic, HLB 8.6
Brij 92 . . . polyoxyethylene olyel ether, nonionic, HLB 4.9
Neodol 25-3 . . . linear primary alcohol ethoxylate, nonionic, HLB 7.9
Petrosul H-50 . . . sodium petroleum sulfonate, anionic,
Tween 85 . . . sorbitan trioleate, nonionic, HLB 11.0

EXAMPLE VIII

The present test was performed to determine the lubricity coefficient of varying molecular weight polypropylene glycerols which were added to base mud compositions. In each instance, the materials decreased the lubricity coefficient. The results of this test are set for in Table 8, below:

TABLE 8

| | Lubricity Coefficient | % Decrease |
|---|---|---|
| Base Mud | 0.27 | |
| +4% 750 PG | 0.21* | 22.2 |
| +4% 3000 PG | 0.20* | 25.9 |
| +4% 7500 PG | 0.20* | 25.9 |

Base Mud Compositon
25 lb/bbl gelling agent
0.06 lb/bbl NaOH
1.0 lb/bbl sodium lignosulfonate
29.0 lb/bbl barite
*Emulsion broke during testing.
Number before PG (polypropylene glycerol) is the average molecular weight.

EXAMPLE IX

The present example demonstrates the effect of polypropylene glycerol-surfactant materials on lubricity coefficient. The results of this test are set for in Table 9, below:

TABLE 9

| | Lubricity Coefficient | % Decrease |
|---|---|---|
| Base Mud | 0.27 | |
| +4% 750 PG-Tween 85 | 0.17* | 37.0 |
| +4% 750 PG-Span 20 | 0.02* | 92.6 |
| +4% 3000 PG-Actrasol MY-75 | 0.02** | 92.6 |
| +4% 3000 PG-Brij 92 | 0.10 | 63.0 |
| +4% 7500 PG-Petrosul H-50 | 0.03 | 88.9 |
| +4% 7500 PG-Span 20 | 0.03 | 88.9 |

*Emulsion very foamy.
**Emulsion partially broke during testing.
Notes:
1. The polypropylene glycerol-surfactant addition consisted of 90% PG and 10% surfactant.
2. Surfactants:.
Tween 85 . . . sorbitan trioleate, nonionic, HLB 11.0
Span 20 . . . sorbitan monolaurate, nonionic, HLB 8.6
Actrasol MY-75 . . . sulfated soybean oil, anionic
Brij 92 . . . polyoxyethylene oleyl ether, nonionic, HLB 4.9
Petrosul H-50 . . . sodium petroleum sulfonate, anionic
3. Number before PG indicates average molecular weight.

EXAMPLE X

The present example demonstrates the ability of the composition of the present invention, including a surfactant, a hydrotrope, and a polyglycol to decrease the lubricity coefficient of a drilling fluid. The results of this test are set forth in Table 10, below:

TABLE 10

| Effect of Hydrotrope on Lubricity Coefficient | | |
|---|---|---|
| | Lubricity Coefficient | % Decrease |
| Base Mud | 0.25 | |
| +4% 1200 PPG-Span 20-SXS | 0.03 | 88 |
| +4% 2000 PPG-Brij 92-SXS | 0.12 | 52 |
| +4% 4000 PPG-Actrasol My-75-SCS | 0.03 | 88 |
| +4% 5700 PPG-Tween 85-SCS | 0.18* | 28 |
| +4% 4000 PPG-Tween 85-SXS | 0.23* | 8 |
| +4% 750 PG-Span 20-SCS | 0.04** | 84 |
| +4% 3000 PG-Petrosul H-50-SCS | 0.03 | 88 |
| +4% 7500 PG-Actrasol My-75-SXS | 0.02 | 92 |
| +4% 7500 PG-Petrosul H-50-SXS | 0.02 | 92 |

*Mud flocculated
**Foamed severely

Notes:
1. PPG = polypropylene glycol, number before indicates average molecular weight
2. PG = polypropylene glycerol, number before indicates average molecular weight
3. Surfactants
Span 20 . . . sorbitan monolaurate, nonionic HLB 8.6
Brij 92 . . . polyoxyethylene oleyl ether, nonionic HLB 4.9
Actrasol My-75 . . . sulfated soybean oil, anionic
Tween 85 . . . sorbitan trioleate, nonionic HLB 11
Petrosul H-50 . . . sodium petroleum sulfonate, anionic

| Mud Composition | lb/bbl |
|---|---|
| gelling agent | 25 |
| sodium lignosulfonate | 1 |
| Barite | 29 |
| NaOH | 0.06 |

In accordance with the present invention, it will be appreciated that the surfactant may, or may not, be included with the composition introduced originally into the well. The selected polyglycol may, accordingly, be introduced either with the surfactant, or before, or subsequent to the introduction of the surfactant.

It will also be appreciated that the use of a hydrotrope may, or may not be, particularly desirable in view of the working parameters of the drilling fluid and the selected and particular composition at hand.

Although the invention has been described in terms of specified embodiments which are set forth in detail, it should be understood that this is by illustration only and that the invention is not necessarily limited thereto, since alternative techniques will become apparent to those skilled in the art in view of the disclosure. Accordingly, modifications are contemplated which can be made without departing from the spirit of the described invention.

What is claimed and desired to be secured by Letters Patent is:

1. A method for the prevention of balling of formation cuttings upon the surface of drilling equipment used in conjunction with the drilling, completion or workover of a subterranean well, comprising the steps of:
    (1) preparing an aqueous system;
    (2) adding to said system a non-water soluble polyglycol having a molecular weight of from between about 1,200 and about 10,000;
    (3) introducing the system containing said polyglycol into the well for circulation through and out of said well; and
    (4) contacting the surface of said drilling equipment with said polyglycol to provide a non-aqueous interface between the equipment surface and the aqueous system.

2. The method of claim 1 wherein the non-water soluble polyglycol is polypropylene glycol.

3. The method of claim 1 wherein the non-water soluble polyglycol is polypropylene glycerol.

4. The method of claim 1 wherein the non-water soluble polyglycol is derived from a di- or tri- hydroxy alcohol.

5. In a subterranean well into which is inserted a metallic conduit to the end of which is affixed a drill bit, the method of lubricating the exterior of said conduit and said drill bit to abate differential sticking, and the like, comprising the steps of:
    (1) circulating into said well a drilling fluid having present therein a non-water soluble polyglycol having a molecular weight of from between about 1,200 and about 10,000; and
    (2) contacting the exterior of said conduit and said drill bit with an effective lubricating amount of said polyglycol.

6. The method of claim 5 wherein the non-water soluble polyglycol is polypropylene glycol.

7. The method of claim 5 wherein the non-water soluble polyglycol is polypropylene glycerol.

8. The method of claim 5 wherein the non-water soluble polyglycol is derived from a di- or tri- hydroxyl alcohol.

* * * * *